March 27, 1962 B. B. WINTER 3,026,845
STOCK FEEDING DEVICE
Filed Dec. 20, 1960 2 Sheets-Sheet 1

INVENTOR.
BILLY BERT WINTER
BY Wolfe, Hubbard,
Voit & Osann
ATTYS.

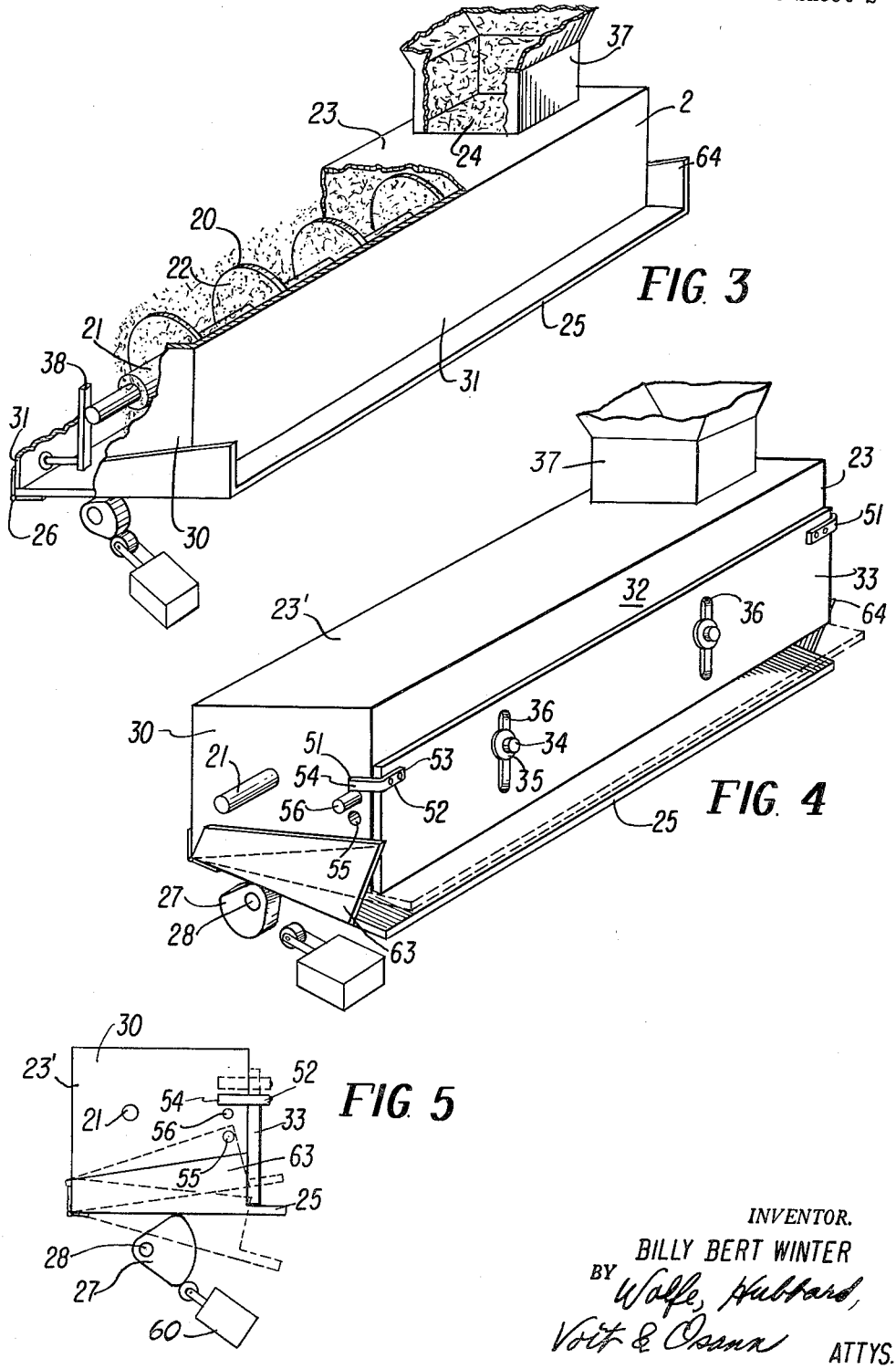

United States Patent Office 3,026,845
Patented Mar. 27, 1962

3,026,845
STOCK FEEDING DEVICE
Billy B. Winter, Towanda, Ill.
Filed Dec. 20, 1960, Ser. No. 77,099
6 Claims. (Cl. 119—51.11)

This invention relates to a device for automatically feeding livestock, such as cattle, horses, hogs, poultry, or the like. More specifically, it relates to a device which is used to supply feed to said livestock at predetermined times and in predetermined quantities. The feeds especially contemplated to be handled by this invention are of the fibrous and fluffy type. In contrast, the device disclosed in my Patent No. 2,940,639 is especially suited to handling feeds of the nonfibrous type.

The increasingly large number of livestock in this country, coupled with the diminished amount of farm labor, has led to a serious feeding problem in recent years. The older methods of carrying feed by hand in small containers are no longer satisfactory, nor consistent with the modern mechanization which we now accept as normal on our farms. In addition, it is an agricultural fact that certain types of stock, especially cattle, become disturbed by the presence of people during feeding time and that they will eat much better—hence, gain more weight—if undisturbed. It is a further accepted fact that regular feedings two, three or four times daily will also tend to improve the eating capacity of the stock with resulting increase in the rate of gain of weight.

It is highly desirable, therefore, that automatic feeding methods be developed for regular feedings of livestock.

Devices known heretofore for automatic feeding of livestock conventionally provide a single discharge opening from which is periodically discharged a supply of feed for a number of animals. In some cases, the feed was then mechanically disturbed along the length of a feed bunk. One troublesome problem with such an arrangement is that the animals crowd around the single discharge opening to obtain access to the feed as it emerges. The stronger animals pushed the weaker animals away and it was difficult, in consequence, to provide proper feeding of all of the animals intended to be serviced by the apparatus.

It is now proposed by applicant to provide a stock feeder for depositing a ribbon of feed simultaneously along the entire length of the feed bunk and to provide time controlled operation of such a stock feeder so as to deposit the ribbon of feed at preselected feeding times.

An object of the invention is to provide a stock feeder with a variable discharge rate and means for adjustment so that a predetermined quantity of feed may be discharged in the form of a ribbon at preselected feeding times.

This application is a continuation-in-part of applicant's copending applications Serial No. 622,891, filed November 19, 1956 and now abandoned.

Further objects will appear from the following description taken in conjunction with the accompanying drawings, in which:

FIG. 3 is a perspective view with parts broken away of the feed container and discharge gate of the stock feeder shown in FIGURE 1, with the discharge gate closed;

FIG. 4 is a perspective view illustrating a modified construction of a container and discharge gate for the stock feeder shown in FIGURE 1; and FIG. 5 is a view in elevation of the end of the container and gate shown in FIG. 4, depicting in dashed lines the different positions of the gate and front wall of the container during a discharge cycle.

Figure 1:
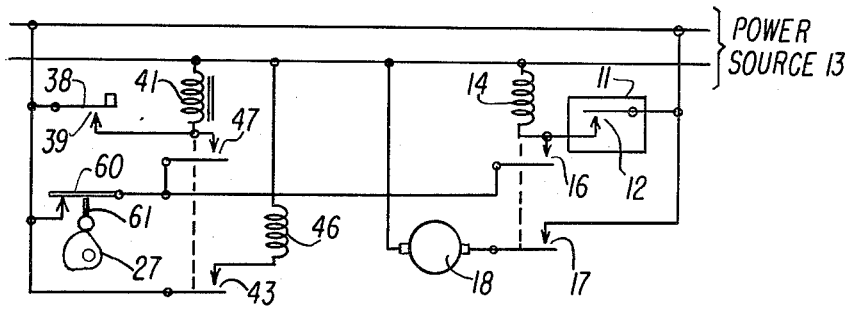
FIGURE 1 is a wiring diagram of the control circuit for a stock feeder embodying this invention.

While the invention is susceptible of various modifications and alternative constructions, illustrative embodiments have been shown in the drawings and will be described below in considerable detail. It should be understood, however, that there is no intention to limit the invention to the specific forms disclosed, but on the contrary, the intention is to cover all modifications, alternative constructions and equivalents falling within the spirit and scope of the invention as expressed in the appended claims.

Figure 2:
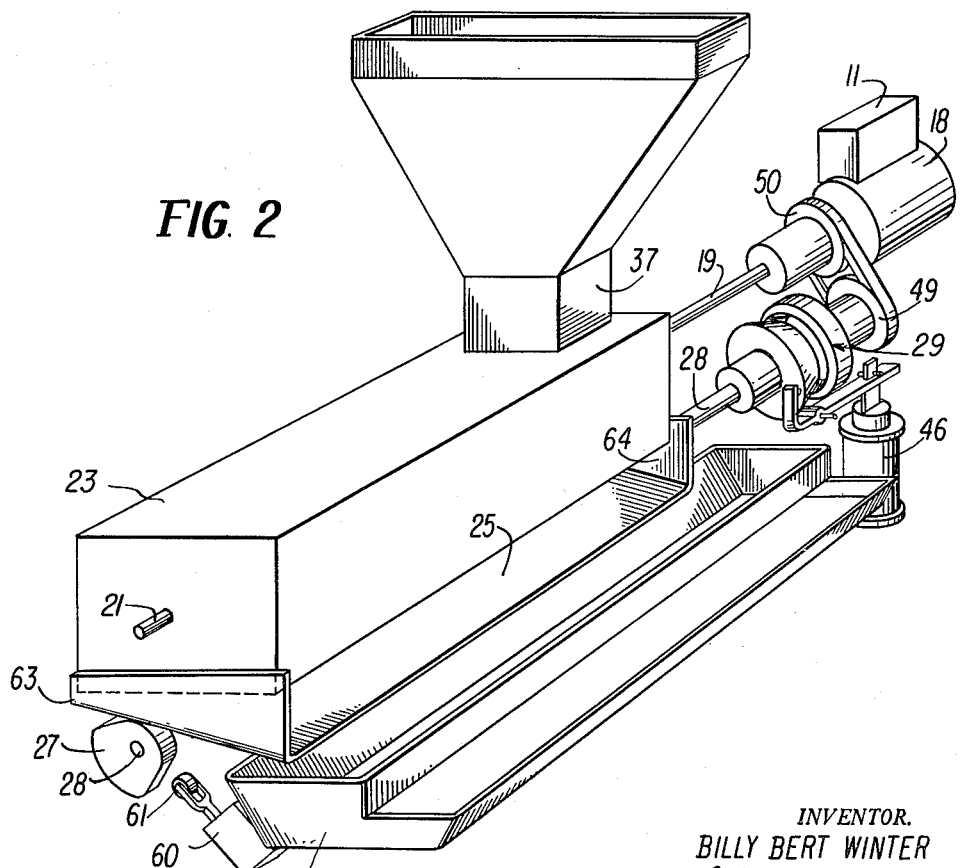
FIG. 2 is a perspective view of a stock feeder embodying the invention with the discharge gate open.

Referring to FIG. 2, a stock feeder embodying the invention is shown mounted over a feed bunker on bunk B, for discharge of feed from within the elongated rectangular container 23 of the feeder for periodically supplying feed into the feed bunk. In this case, as shown in FIG. 3, feed is supplied through the funnel shaped hopper or feed supply device 37, and by means of a power driven conveyor herein shown as the auger 20 the container is filled. The feed is discharged through a slot along a major portion of the bottom side of the container by lowering a discharge gate 25 which is hinged to the fixed rearside and forms the bottom side of the container 23 so that all or part of its feed contents is deposited into the feed bunk. At feeding time, the discharge gate 25 is lowered to its open position shown in FIGURE 1 and subsequently raised to its closed position over the discharge slot as shown in FIG. 3 until the next feeding time.

According to this invention, this stock feeder is operated through a feed discharge cycle at each of the preselected feeding times. Referring to FIGURES 1 and 2, a timer 11 is provided for starting each feed discharge cycle. Apparatus for raising and lowering the discharge gate 25 of the container, herein shown as a cam 27 carried on a cam shaft 28, is operated during each feed discharge cycle by a motor 18 and control circuit including the timer 11 shown in FIGURE 1. Referring to FIG. 2 for details of this discharge gate operating apparatus, the cam shaft 28 is driven from the motor shaft 19 through belt driven pulleys 49, 50 and a clutch 29 engageable by an actuating solenoid 46. The gate is opened from its closed (raised) position shown in FIG. 3 and subsequently closed by engaging the clutch 29 to cause the cam 27 to rotate through 360°.

In the operation of the stock feeder, the timer 11 is preset at the times at which it is desired to feed the stock. It may be set, for example, at 6 a.m., 10 a.m., 2 p.m., and 6 p.m., or at any other hours and frequencies found desirable according to the type and age of stock, the season of the year, or other factors. When the preselected time is reached, the timer 11 closes the timer switch 12 thereby energizing the motor relay coil 14. With the motor relay so energized, its holding contacts 16 are closed to maintain the relay coil 14 energized through the normally closed contacts of a switch 60 operated by the discharge gate cam 27. The motor relay has a second set of contacts 17 which with the relay energized are closed to start the motor 18 marking the start of the feed discharge cycle.

At the start of each feed cycle feed is drawn into the container 23 from the hopper 37 and carried along within the container by the auger shaft 21 turning the helical blade 22 of the auger 20. In this case, the auger shaft 21 is a continuation of the motor shaft 19 and thus is directly operated by the motor 18. A given amount of feed is carried into and generally uniformly distributed along the container 23 by the auger 20 until the container is full, at which time the discharge gate 25 is opened to discharge the contents of the container. In carrying out the foregoing, still referring to FIGURE 1, pressure of the feed against a pressure switch arm 38 mounted in the closed end of the container 23 (FIG. 3) closes the switch contacts 39. Closing of these switch contacts 39 energizes the gate relay coil 41 having holding contacts 47 which when closed maintain the relay coil energized through the normally closed contacts of the gate switch 60. A second set of contacts 43 of the gate relay are closed when it is so energized to close a circuit through the clutch actuating solenoid 46 (FIGURE 1) which engages the clutch 29 placing the motor 18 in drive relation with the cam shaft 28 through belt driven pulleys 49, 50. The cam 27 is rotated clockwise, as viewed in FIGS. 2 and 3, during the feed discharge cycle.

At the completion of one revolution of the cam shaft 28 and cam 27, the latter momentarily separates the contacts of the gate switch 60 by means herein shown in FIGURES 1 and 2 as the actuating arm 61 which is stuck by the enlarged lobe of the gate cam 27; the switch contacts are forced shut again to make the circuit operative at the next cycle. By opening the gate switch 60, marking the end of the feed discharge cycle, the circuit is deenergized through the holding contacts 16 of the motor relay coil 14, thus deenergizing the motor relay, opening its contacts, and shutting off the motor 18. By opening the gate switch 60, the circuit is also deenergized through the holding contacts 47 to the gate relay coil 41, which drops out its relay contacts 43 and thereby opens the circuit to and deenergizes the clutch actuating solenoid 46. Thus at the completion of the feed discharge cycle, the motor 18 is shut off and the cam shaft 28 is declutched from the pulley drive with the cam 27 in its original position raising the gate 25 to its closed position.

A further feature of the invention is the provision of means for adjusting the discharge rate at which the contents of the stock feeder container are deposited into the feed bunk. Thus the amount of feed deposited during a feed discharge cycle may be set according to the number of animals serviced, or the amount of feed may be reduced or increased and the frequency of feeding reduced or increased to carry out a changed feed program. A stock feeder having features enabling preselection of the amount of feed deposited as well as the frequency of the feed discharge cycles, in keeping with this invention, is shown in FIG. 4 as including a container 23' for receiving feed from a hopper 37 and adapted to be arranged similarly to the stock feeder of FIGURE 1 over a feed bunk. A discharge gate 25 hinged to and forming the bottom side of the container 23' is shown in open position in FIG. 4, and is adapted to be lowered thereto from the closed position shown in solid lines in FIG. 5 by means herein shown as the cam 27. To provide a variable discharge rate, in the present case means are included for varying the size of the discharge opening defined between the discharge gate 25 and the lower edge of a front panel 33 mounted on the container 23'. For this purpose the front panel 33 is slidably carried on the front side 32 of the container 32' by means such as pins 34 which are supported by the side 32 to pass through vertical slots 36 in the panel and carry washers 35 fixed to the pins 34. A right angle clip 51 is attached to the upper position of the panel 33 at each end by means of screws 52 through the leg 53, with the other leg 54 extending rearwardly in abutting relation with the end 30 of the container. A plurality of holes 55 are located in the end 30, and by inserting a pin 56 into any of the holes 55 as desired, an effective stop is provided. The leg 54 resting upon the pin 56 governs the lowermost position of the panel 33, while the relationship of the slots 36 and bolts 34 permit the panel to be raised to its highest position.

The same control circuit shown in FIGURE 1 may be employed with the embodiment of the invention shown in FIG. 4, to operate the auger shaft 21 and cam shaft 28 by a drive arranged, for example, as illustrated in FIG. 2. It will readily be understood, therefore, without repeating the description of the details of the operating apparatus and control means, that at the start of each feed discharge cycle, the container 23' is filled with feed from the hopper by an auger 20 on the augur shaft 21, and when the container 23' is filled, the cam 27 is revolved to discharge feed from the container 23' into a feed bunk below. In the embodiment of the stock feeder device illustrated in FIGS. 4 and 5, the discharge gate 25 is lowered as the cam 27 revolves and the front panel 33 lowers with it from the closed position of FIG. 5 until the clip 51 abuts the pin 56 in the end 30 of the container, whereupon the discharge gate 25 continues to lower, falling away from the front panel 33 and creating a discharge opening for feed in the container 23'. It will be seen that the size of this discharge opening depends on the lowermost position of the front panel 33 and this position, in turn, depends on the vertical position of the pin 56.

During the feed discharge cycle, the cam 27 operates through 360° of rotation, the discharge gate 25 travelling to a full open position and then lifting toward the front panel 33. The front panel 33 is engaged and raised by the discharge gate as the cam continues to revolve, and in the present case, the discharge gate is lifted above its final horizontal position by the cam 27, to an upwardly inclined position shown in dashed lines in FIG. 5. The front panel 33 is raised and lowered by the discharge gate 25 as the latter travels through such upwardly inclined position to its final horizontal position, also shown in FIG. 5. One advantage of such an arrangement is that any feed particles caught between the lower edge of the front panel 33 and the gate as the latter closes, fall from between these parts when the discharge gate is elevated to its upwardly inclined position, so as to avoid trapping particles of feed therebetween which would prevent a tight seal when the gate is closed. The end wings 63, 64 confine the flow of feed to the discharge opening and close the gap, present in the closed position of the gate, between the gate and the lower edge of the container end 30, which lower edge may slope upwardly to accommodate the range of movement of the gate 25 above the horizontal.

The quantity of feed discharged in a feed cycle may also be adjusted by adjusting the volume of the container 23' and, hence, the quantity of feed that the container will hold when full. This is achieved by adjusting the cam 27 to vary the angle that the hinged discharge gate 25 is supported at the stopping position of the cam.

Further modifications and variations of this invention are contemplated. For example, containers may be grouped in tandem or end to end arrangements if desired to service a plurality of feed bunks. The shafts of a plurality of units may be coupled together to permit operation by a single driving and control system. A single container may feed a plurality of units or each unit may have its own container feed supply. By the same token, a plurality of units may be utilized each with its own feed supply and drive but operated by a single timing circuit so all are synchronized. Variations in the electrical and mechanical devices illustrated are especially contemplated, and the details shown are in no way intended to limit my invention.

I claim as my invention:

1. In a stock feeder for periodically supplying feed to an elongated feed bunk for a plurality of stock animals to feed, the combination comprising, an elongated feed distributing container adapted to be mounted over said bunk, said container including a discharge slot along a major portion of one side of the container, a feed supply device in discharging relation with and opening into said container for supplying feed thereto, a power driven feed conveyor within said container extending along said slot for generally uniformly distributing a given amount of feed along the length of the container, normally closed movable closure means mounted over said discharge slot which closure means, when moved to an open position, opens said discharge slot the entire length thereof to dump said given amount of feed from said container, and closure control means for operating said closure means so as to deposit the feed in the form of a continuous substantially uninterrupted ribbon of feed in the feed bunk under said container.

2. In a stock feeder for periodically supplying feed to an elongated feed bunk for a plurality of stock animals to feed, the combination comprising, an elongated feed distributing container adapted to be mounted over said bunk, said container including a discharge slot along the length of one side of the container, a feed supply device in discharging relation with and opening into said container for supplying feed thereto, a power driven auger longitudinally disposed within said container extending along said slot for generally uniformly distributing a given amount of feed along the length of the container, normally closed movable closure means mounted over said discharge slot which closure means, when moved to an open position, opens said discharge slot the entire length thereof to dump said given amount of feed from said container, and closure control means for operating said closure means so as to deposit the feed in the form of a continuous substantially uninterrupted ribbon of feed in the feed bunk under said container.

3. In a stock feeder for periodically supplying feed to an elongated feed bunk for a plurality of stock animals to feed, the combination comprising, an elongated feed distributing container adapted to be mounted over said bunk, said container including a discharge slot along a major portion of one side of the container, a feed supply device in discharging relation with and opening into said container for supplying feed thereto, a power driven feed conveyor within said container extending along said slot for generally uniformly distributing feed along the length of the container, normally closed movable closure means mounted over said discharge slot which closure means, when moved to an open position, opens said discharge slot the entire length thereof to dump said feed from said container, a timer device for actuating said conveyor at a preselected time, and closure control means for operating said closure means in response to the filling of said container so as to deposit the feed in the form of a continuous substantially uninterrupted ribbon of feed in the feed bunk under said container.

4. In a stock feeder for periodically supplying feed to an elongated feed bunk for a plurality of stock animals to feed, the combination comprising, an elongated feed distributing container adapted to be mounted over said bunk, said container including side walls and a discharge slot along a major portion of the bottom side of the container, a feed supply device in discharging relation with and opening into said container for supplying feed thereto, a power driven feed conveyor within said container extending along said slot for generally uniformly distributing a given amount of feed along the length of the container, a hinged discharge gate mounted over said discharge slot and defining a bottom for said container, panel means movably mounted on one of said side walls to define an extension thereof and in the path of movement of said gate, said gate when fully lowered being spaced from said panel means to open said discharge slot the entire length thereof to dump said given amount of feed from said container, said gate when fully raised having contact with said panel means to close said slot, means adjustably limiting the distance said panel means moves downwardly, and control means for operating said gate periodically so as to deposit the feed in the form of a continuous substantially uninterrupted ribbon of feed in the feed bunk under said container.

5. In a stock feeder for periodically supplying feed to an elongated feed bunk for a plurality of stock animals to feed, the combination comprising, an elongated feed distributing container adapted to be mounted over said bunk, said container including a fixed longitudinal side, a discharge slot along a major portion of another side of the container, a feed supply device in discharging relation with and opening into said container for supplying feed thereto, a power driven feed conveyor within said container extending along said slot for generally uniformly distributing a given amount of feed along the length of the container, a hinged longitudinal side forming a gate mounted over said discharge slot, said gate having a closed raised position and an open position swung away from said closed raised position to open said discharge slot the entire length thereof to dump said given amount of feed from said container, and gate control means including means for holding said gate in a closed raised position, and means for releasing said gate so as to deposit the feed in the form of a continuous substantially uninterrupted ribbon of feed in the feed bunk under said container.

6. In a stock feeder for periodically supplying feed to an elongated feed bunk for a plurality of stock animals to feed, the combination comprising, an elongated feed distributing container adapted to be mounted over said bunk, said container being formed to define a discharge opening along a major portion of the bottom portion thereof, a feed supply device in discharging relation with and opening into said container for supplying feed thereto, a power driven feed conveyor within said container extending along said opening for generally uniformly distributing a given amount of feed along the length of the container, normally closed movable closure means closing said discharge opening which closure means, when moved to an open position, opens said discharge opening the length thereof to dump said given amount of feed from said container, and closure control means for operating said closure means so as to deposit the feed in the form of a continuous substantially uninterrupted ribbon of feed in the feed bunk under said container.

References Cited in the file of this patent

UNITED STATES PATENTS

| | | |
|---|---|---|
| 779,434 | Lyon | Jan. 10, 1905 |
| 1,014,163 | Melson | Jan. 9, 1912 |
| 1,429,297 | O'Neill et al. | Sept. 19, 1912 |
| 2,189,213 | MacDonnell | Feb. 6, 1940 |
| 2,646,023 | Virgil | July 21, 1953 |
| 2,794,576 | Reynolds | June 4, 1957 |
| 2,827,156 | Linder | Mar. 18, 1958 |
| 2,926,629 | Hazen | Mar. 1, 1960 |
| 2,961,126 | Craig | Nov. 22, 1960 |
| 2,970,568 | Johnson | Feb. 7, 1961 |